United States Patent
Jin et al.

(10) Patent No.: US 9,235,284 B2
(45) Date of Patent: Jan. 12, 2016

(54) APPARATUS AND METHOD FOR CONTROLLING OF USER INTERFACE EQUIPPED TOUCH SCREEN

(71) Applicants: Hyundai Motor Company, Seoul (KR); SNU R&DB Foundation, Seoul (KR)

(72) Inventors: Sang Eun Jin, Busan (KR); Hyun-Woo Bang, Seoul (KR); Kee Hong Youn, Seoul (KR); Sung Min Cho, Seoul (KR); Jun Bong Song, Seoul (KR); Kyung Won Yun, Seoul (KR); Dong Youb Baek, Seoul (KR); Byung Joo Lee, Seoul (KR); Jae Hyuck Bae, Seoul (KR); Jung Man Chung, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 57 days.

(21) Appl. No.: 14/059,892

(22) Filed: Oct. 22, 2013

(65) Prior Publication Data
US 2015/0009153 A1 Jan. 8, 2015

(30) Foreign Application Priority Data
Jul. 5, 2013 (KR) .......................... 10-2013-0079071

(51) Int. Cl.
*G06F 3/041* (2006.01)

(52) U.S. Cl.
CPC ....................................... *G06F 3/041* (2013.01)

(58) Field of Classification Search
CPC ....... G09G 5/00; G06F 3/041; G06F 3/04883; G06F 3/017
See application file for complete search history.

(56) References Cited

U.S. PATENT DOCUMENTS 8,884,928 B1 * 11/2014 Baldwin ........................ 345/178
2011/0254865 A1 * 10/2011 Yee et al. ...................... 345/661

FOREIGN PATENT DOCUMENTS

| JP | 2012212240 A | 11/2012 |
| KR | 10-2008-0029028 | 4/2008 |
| KR | 10-2009-0017828 | 2/2009 |
| KR | 10-2009-0020157 A | 2/2009 |
| KR | 10-2010-0000070 A | 1/2010 |

OTHER PUBLICATIONS

Bae, Jaehyuck, "Multi-touch Interface by Depth Sensing Camera", Masters Thesis, Seoul National University, Aug. 2012.

* cited by examiner

*Primary Examiner* — Michael Faragalla
(74) *Attorney, Agent, or Firm* — Mintz Levin Cohn Ferris Glovsky and Popeo, P.C.; Peter F. Corless

(57) ABSTRACT

Disclosed is an apparatus and a method for controlling a user interface having a touch screen which includes an input and output unit having a touch screen, a camera which is installed to be separated from the input and output unit, and obtains at least one of an image data corresponding to a space within a critical distance from a front of the touch screen, and a controller which verifies an expected touch position of an object when a movement of the object is detected in the space as a result of an analysis of the image data, and controls the input and output unit to enlarge and output an area corresponding to the expected touch position.

11 Claims, 5 Drawing Sheets

APPARATUS AND METHOD FOR CONTROLLING OF USER INTERFACE EQUIPPED TOUCH SCREEN

CROSS-REFERENCE TO RELATED APPLICATION

This application claims the benefit under 35 U.S.C. §119 (a) of a Korean patent application filed in the Korean Intellectual Property Office on Jul. 5, 2013 and assigned Serial No. 10-2013-0079071, and the entire disclosure of which is hereby incorporated by reference

BACKGROUND

1. Technical Field

The present disclosure relates to an apparatus and a method for controlling a user interface having a touch screen, more particularly, to an apparatus and a method for controlling a user interface having a touch screen which verifies an area where a touch will be generated prior to a generation of a touch on a touch screen by equipping a depth recognition camera, and enlarging and outputting the verified area to a screen.

2. Description of the Related Art

In general, a text input method of a portable terminal using a touch screen includes a handwriting recognition method and a virtual keyboard input method. The handwriting recognition method is a method converting into a data code after recognizing a handwriting of a person by a touch screen, and the virtual keyboard input method is a method receiving a selection information according to a touch of a touch tool capable of using a touch such as a finger or a pen by pop up an input window of a keyboard type on the touch screen to overcome a transportability problem of a keyboard and a mouse in the portable device.

Examples of a terminal equipping with such a touch screen includes an electronic notebook, a mobile communication terminal, a Personal Digital Assistant (PDA), a portable multimedia player (PMP), and a navigation device.

However, in case of the virtual keyboard input method, since it has to display a text input window and the virtual keyboard on a screen at the same time, a size of a key of the virtual keyboard is small. Due to this, it has a problem of causing a typing error frequently by touching a neighboring key in a procedure of touching the key on the virtual keyboard. In particular, when selecting a key with a touch tool having a spacious touch area, or when the virtual keyboard is displayed on a small screen, the input error corresponding to the touch error occurs frequently.

In addition, when a navigation device is equipped with the touch screen, since a driver frequently operates the navigation device during the driving, it may lower the driver's concentration and lead to causing an accident.

SUMMARY

The disclosed embodiments have been made in view of the above problems, and provide an apparatus and a method for controlling a user interface having a touch screen which verifies an area where a touch will be generated prior to the generation of a touch screen by equipping a depth recognition camera, and enlarging and outputting the verified area to a screen.

In accordance with an aspect of the present invention, a user interface controlling apparatus having a touch screen includes an input and output unit having a touch screen, a camera which is installed to be separated from the input and output unit, and obtains at least one of an image data corresponding to a space within a critical distance from a front of the touch screen, and a controller which verifies an expected touch position of the object when a movement of the object is detected in the space as a result of an analysis of the image data, and controls the input and output unit to enlarge and output an area corresponding to the expected touch position.

The camera is a depth recognition camera. The controller analyzes at least one of the image data which is obtained from every regular interval from the space within the critical distance. The controller separates the image data into a background image data and an object image data when a movement of the object is verified in the space by analyzing the image data. The controller verifies a pixel corresponding to a position of the object among a plurality of pixels forming the object image data. The controller verifies an expected touch position at which the object is to touch on the touch screen by mapping the pixel of the verified object image data to a pixel forming a screen which is output on the touch screen. The controller enlarges and displays a screen which is displayed on an area corresponding to the verified expected touch position with a specific ratio, and generates an input signal corresponding to the enlarged screen when a touch is generated on the enlarged screen.

In accordance with another aspect of the present invention, a method for controlling a user interface having a touch screen includes operating a camera in accordance with a signal received from an input and output unit having a touch screen by a controller, analyzing at least one of an image data corresponding to a space within a critical distance from a front of the touch screen which is received from the camera, verifying an expected touch position of the object when a movement of an object is detected on the space as a result of the analysis, and enlarging and outputting an area corresponding to the expected touch position.

Analyzing the image data includes analyzing at least one of an image data which is obtained in every certain interval from the space within the critical distance. Analyzing the image data includes separating the image data into a background image data and an object image data when a movement of the object is detected on the space. Verifying the expected touch position of the object includes verifying a pixel corresponding to a position of the object among a plurality of pixels forming the object image data, and verifying an expected touch position at which the object is to touch on the touch screen by mapping a pixel of the verified object image data to a pixel forming the touch screen. Enlarging and outputting an area corresponding to the expected touch position includes enlarging and displaying a screen which is displayed on an area corresponding to the verified expected touch position with a specific ratio.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the below methods are executed by at least one controller. The term "controller" refers to a hardware device that includes a memory and a processor. The memory is configured to store program instructions, and the processor is specifically configured to execute said program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
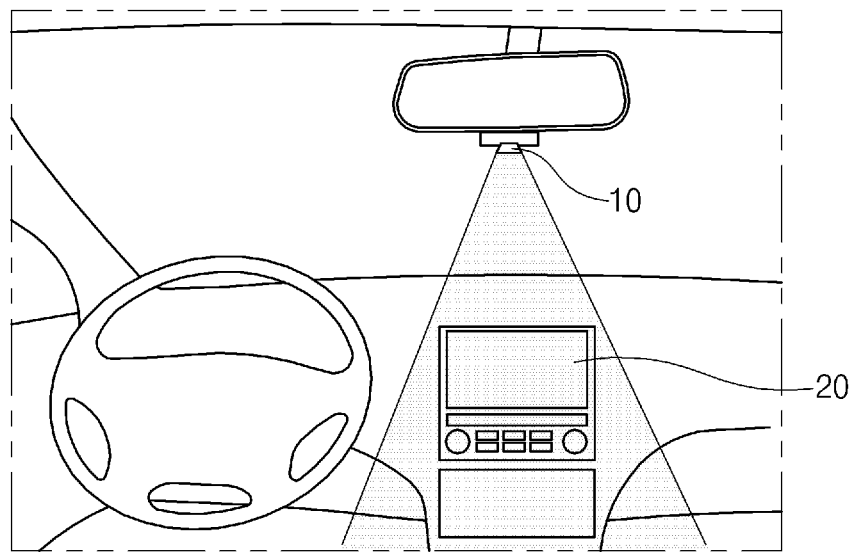
FIG. 1 is a diagram illustrating a user interface controlling apparatus having a touch screen according to an exemplary embodiment of the present disclosure.
Figure 2:
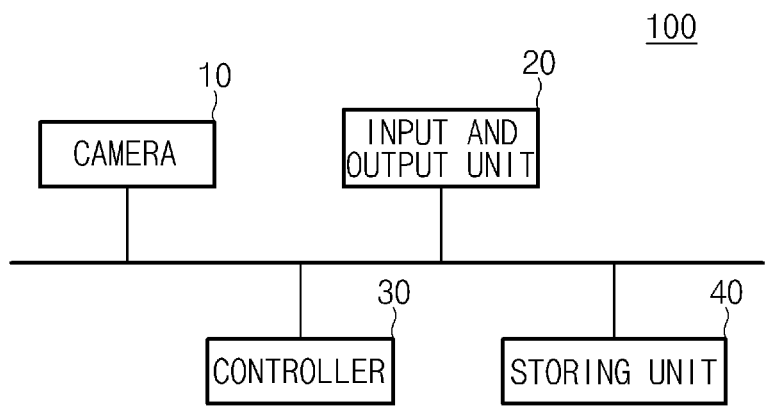
FIG. 2 is a block diagram illustrating an element of a user interface controlling apparatus having a touch screen according to an exemplary embodiment of the present disclosure.
Figure 3:
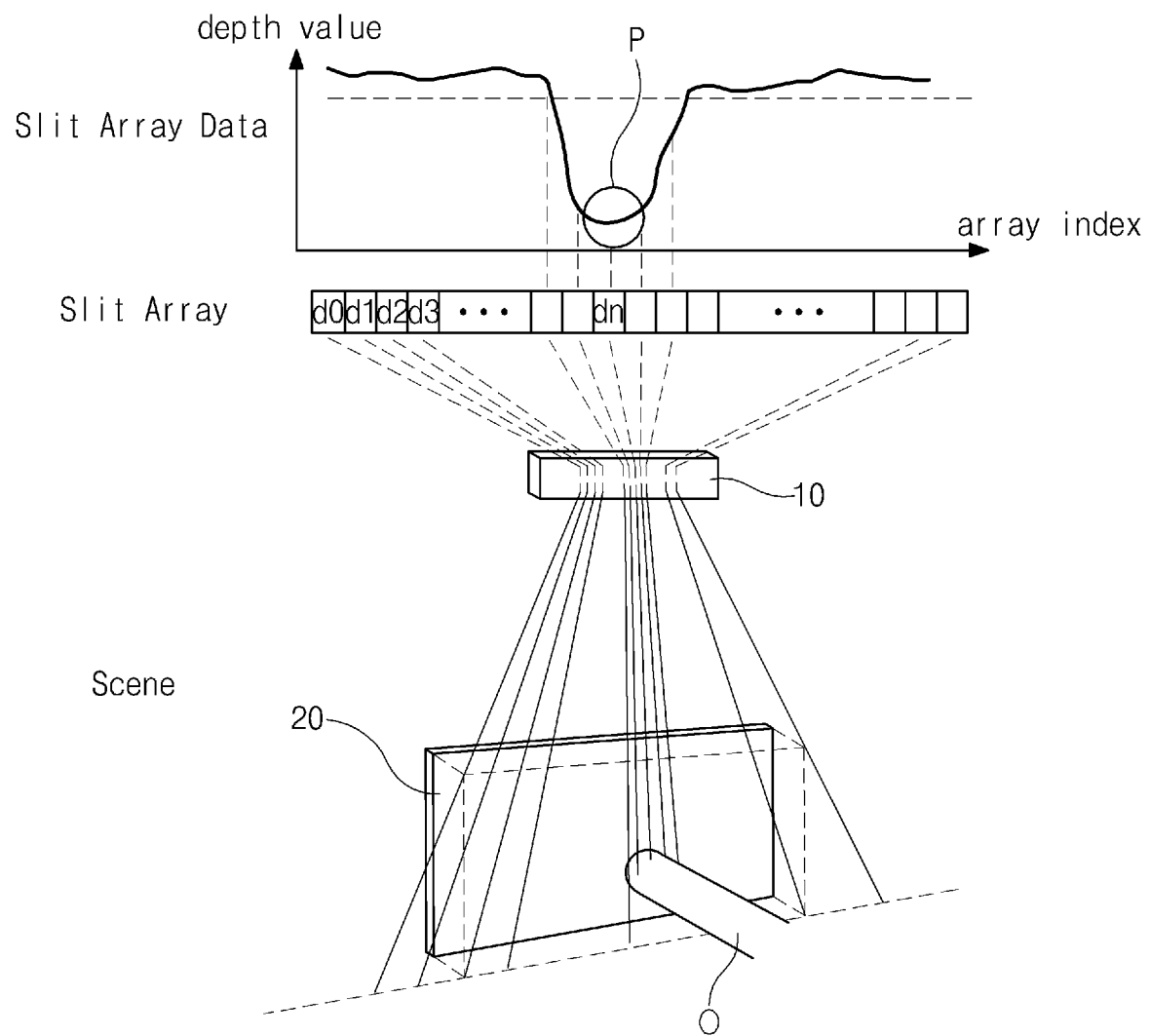
FIG. 3 is a diagram for explaining a method of extracting an area where a touch is expected according to an exemplary embodiment of the present disclosure.

FIG. 1 is a diagram illustrating a user interface controlling apparatus having a touch screen according to an exemplary embodiment of the present disclosure. FIG. 2 is a block diagram illustrating an element of a user interface controlling apparatus having a touch screen according to an exemplary embodiment of the present disclosure. FIG. 3 is a diagram explaining a method of extracting an area where a touch is expected according to an exemplary embodiment of the present disclosure.

Referring to FIGS. 1 to 3, the user interface controlling apparatus (hereinafter, refers to as a control apparatus 100) having a touch screen includes a camera 10, an input and output unit 20, a controller 30, and a storing unit 40.

A depth recognition camera is desirable to be used for the camera. As illustrated in FIG. 1, the camera 10 is installed on the upper part of the input and output unit 20, and obtains an image data of an object accessing to the input and output unit 20. The camera 10 obtains in real time the image data corresponding to the space where a critical distance is separated or within the critical distance from a front of the touch screen which is the input and output unit 20, in particular, an input unit, and provides thereof to the controller 30. At this time, the camera 10 obtains the image data of the area corresponding to a regular interval from the space within the critical distance in real time and may provide the same to the controller 30.

The input and output unit 20 may include an input unit and an output unit. The input unit detects an input of a user and generates a corresponding input signal to provide to the controller 30. It is desirable that the input unit is formed as a touch screen as illustrated in FIGS. 1 and 3, and moreover, may further include an apparatus such as a keypad and a touch pad.

The output unit outputs various information according to an operation of the control apparatus 100 under the control of the controller 30. The output device is a device such as a Liquid Crystal display (LCD), a Thin Film Transistor Liquid Crystal Display (TFT LCD), and an Organic Light Emitting Diode (OLED), and a Flexible Display may be used for the output unit, and when the input unit is the touch screen, it is desirable to serve as the output unit of the touch screen.

The controller 30 verifies an expected touch position of an object when a movement of the object is detected in a space within the critical distance from the front of the touch screen by analyzing an image data obtained from the camera 10, and enlarges and outputs the area corresponding to the position.

In more detail, since the camera 10 which is equipped to the control apparatus 100 is a depth recognition camera, the controller 30 may verify a separated distance between each pixel forming the image data obtained from the camera 10 and the touch screen.

In other words, the controller 30 sets the image data of a case when the movement of the object does not exist in front of the touch screen as a background image data, and stores the same in the storing unit 40. The controller 30 recognizes that the movement of the object exists in the verified image data when the image data which is different from the background image data is verified by comparing the image data obtained in real time from the camera 10 and the background image data. The controller 30 separates the verified image data into the background image data and the object image data, and obtains a space information of the object crossing the space within the critical distance from the front of the touch screen by verifying a vertical/horizontal pixel forming the object image data.

In addition, when the image data of the area corresponding to the regular interval in the space within the critical distance from the camera 10 is received, the controller 30 sequentially analyzes the image data from the area which is located the farthest from the touch screen to the area which is located the closest to the touch screen. Through this, the controller 30 may predict a progress direction of the object more accurately.

The storing unit 40 stores the background image data under the control of the controller 30, and stores various programs to control the control apparatus 100.

Referring to FIG. 3, the controller 30 obtains a distance information within a plane of a space where the corresponding row in which a movement of the object (O) is detected is indicated as illustrated in a slit array of FIG. 3 as a value arrangement corresponding to the image data. When schematizing this arrangement, it may be indicated as an array data in FIG. 3. In other words, when the object (O) accesses to a scene in FIG. 3, the point to which the object accessed may be indicated as P point of the slit array data. At this time, the P point may be a space information corresponding to a position of the object (O) which crosses the space within the critical distance from the front of the touch screen.

Based on the space information of the obtained object (O), the controller 30 verifies thereof as the expected touch position. The controller 30 extracts the expected touch position to which the object is to touch by mapping a pixel corresponding to the verified expected touch position to a pixel forming a screen displayed on the touch screen. The controller 30 enlarges and outputs the screen displayed on the area corresponding to the extracted expected touch position with a specific ratio. Here, the object (O) may be a user's finger, and preferably be a touchable object such as a touch pen.

In addition, in FIG. 3, it is described that one slit array is analyzed; however, the controller 30 sequentially analyzes the image data from the area which is located the farthest from the touch screen to the area which is located the nearest to the touch screen among at least one of the image data received from the camera 10. In this case, since it is possible to verify the movement of the object sequentially from when the object is far away from the touch screen, as illustrated in FIG. 3, it may verify the progress direction of the object more promptly than analyzing one slit array.

In addition, in an exemplary embodiment of the present disclosure, the camera 10 is described as positioned on the input and output unit 20; however, it is not limited thereto, and may be installed according to a driver's preference regardless of the position.

Figure 4:
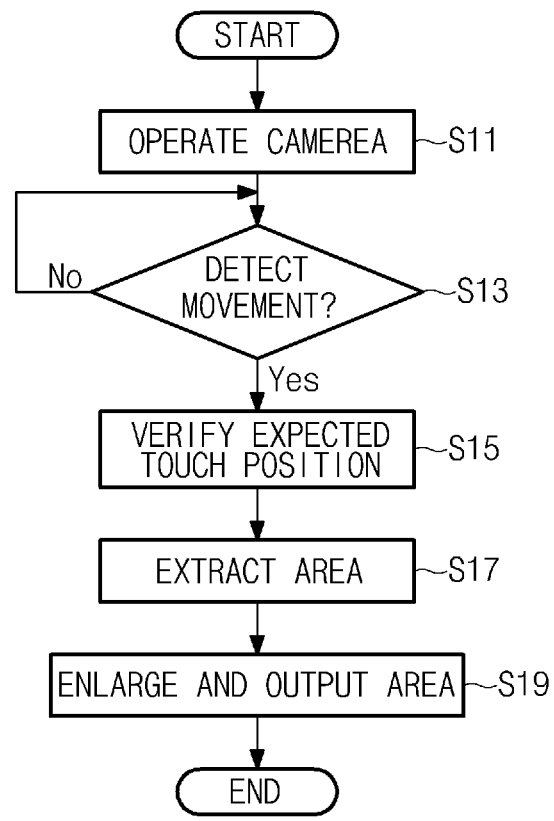
FIG. 4 is a flowchart for explaining a user interface controlling method having a touch screen according to an exemplary embodiment of the present disclosure.
Figure 5:
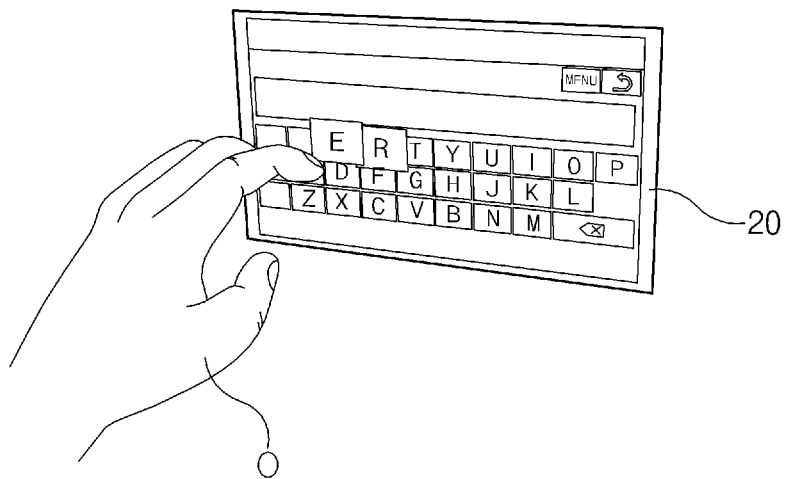
FIG. 5 is an exemplary diagram illustrating a user interface controlling screen having a touch screen according to an exemplary embodiment of the present disclosure.

FIG. 4 is a flowchart explaining a user interface controlling method having a touch screen according to an exemplary embodiment of the present disclosure. FIG. 5 is an exemplary diagram illustrating a user interface controlling screen having a touch screen according to an exemplary embodiment of the present disclosure.

Referring to FIGS. 4 and 5, the controller 30 operates the camera 10 by entering into a user interface controlling mode according to an input from outside (S11). The controller 30 verifies if the movement of the object exists in the image data by analyzing the image data received from the camera 10 (S13). In more detail, the controller 30 may verify a separated distance between each pixel forming the image data obtained from the camera 10 and the touch screen. The controller 30 continuously accumulates the image data when the movement of the object does not exist in front of the touch screen and set as the background image data. In addition, the controller 30 compares the image data which is obtained in real time from the camera 10 and the background data, and proceeds to step S15 when recognizing that the movement of the object exists when the difference between the obtained image data and the background data is verified.

The controller 30 separates the obtained image data into the background image data and the object image data, and obtains the space information of the object crossing the space within the critical distance from the front of the touch screen by verifying the horizontal/vertical pixel forming the object image data. Here, the description for obtaining the space information of the object is omitted since it is already described in detail in FIGS. 1 to 3.

In succession, the controller 30 analyzes the separated object image data and verifies the pixel corresponding to the position where the object exists to verify the expected touch position (S15). The controller 30 extracts the expected touch position at which the object is to touch by mapping the pixel corresponding to the verified expected touch position to the pixel forming the screen which is displayed on the touch screen (S17). The controller 30 enlarges and outputs the screen displayed on the area corresponding to the extracted expected touch position with a specific ratio (S19). This may be indicated as FIG. 5.

As described above, the disclosed embodiments prevent the concentration lowering of the driver, and has a remarkable effect of minimizing an incidence rate of an accident which may be caused due to a navigation device operation during the driving by enlarging and outputting the area which the driver is to touch before the object, such as a driver's finger or a touch pen, reaches to the touch screen.

Likewise, the disclosed embodiments verify an area where the touch will be generated prior to the generation of the touch on the touch screen by equipping a depth recognition camera, and have an effect of minimizing an input error by enlarging and outputting a screen of the verified area.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

FIG. 2
10: CAMERA
20: INPUT AND OUTPUT UNIT
30: CONTROLLER
40: STORING UNIT
FIG. 4
START
S11: OPERATE CAMERA
S13: DETECT MOVEMENT?
S15: VERIFY EXPECTED TOUCH POSITION
S17: EXTRACT AREA
S19: ENLARGE AND OUTPUT AREA
END

What is claimed is:

1. An apparatus for controlling a user interface having a touch screen, the apparatus comprising:
    an input and output unit having a touch screen;
    a camera which is installed to be separated from the input and output unit, and obtains at least one image data corresponding to a space within a critical distance from a front of the touch screen; and
    a controller which analyzes the at least one image data, which is obtained at regular intervals, from the space within the critical distance, separates the at least one image data into a background image data and an object image data when a movement of the object is verified in the space by analyzing the at least one image data, verifies an expected touch position of an object when a movement of the object is detected in the space as a result of an analysis of the at least one image data, and controls the input and output unit to enlarge and output an area corresponding to the expected touch position.

2. The apparatus of claim 1, wherein the camera is a depth recognition camera.

3. The apparatus of claim 1, wherein the controller verifies a pixel corresponding to a position of the object among a plurality of pixels forming the object image data.

4. The apparatus of claim 3, wherein the controller verifies an expected touch position at which the object is to touch on the touch screen by mapping the pixel of the verified object image data to a pixel forming a screen which is output on the touch screen.

5. The apparatus of claim 4, wherein the controller enlarges and displays a screen which is displayed on an area corresponding to the verified expected touch position with a specific ratio, and generates an input signal corresponding to the enlarged screen when a touch is generated on the enlarged screen.

6. A method for controlling a user interface having a touch screen, the method comprising:
   operating a camera in accordance with a signal received from an input and output unit having a touch screen by a controller;
   analyzing, by the controller, at least one image data, which is obtained in regular intervals corresponding to a space within a critical distance from a front of the touch screen which is received from the camera;
   separating, by the controller, the at least one image data into a background image data and an object image data when a movement of the object is detected on the space;
   verifying, by the controller, an expected touch position of an object when a movement of the object is detected on the space as a result of the analysis; and
   enlarging and outputting, by the controller, an area corresponding to the expected touch position.

7. The method of claim 6, wherein the verifying of the expected touch position of the object comprises:
   verifying a pixel corresponding to a position of the object among a plurality of pixels forming the object image data; and
   verifying the expected touch position at which the object is to touch on the touch screen by mapping a pixel of the verified object image data to a pixel forming the touch screen.

8. The method of claim 7, wherein the enlarging and outputting of the area corresponding to the expected touch position comprises enlarging and displaying a screen which is displayed on an area corresponding to the verified expected touch position with a specific ratio.

9. A non-transitory computer readable medium containing program instructions for controlling a user interface having a touch screen, which includes an input and output unit having a touch screen, and a camera which is installed to be separated from the input and output unit, the computer readable medium comprising:
   program instructions that analyze at least one image data, which is obtained in regular intervals, corresponding to a space within a critical distance from a front of the touch screen which is received from the camera;
   program instructions that separate the at least one image data into a background image data and an object image data when a movement of the object is detected on the space;
   program instructions that verify an expected touch position of an object when a movement of the object is detected on the space as a result of the analysis; and
   program instructions that enlarge and output an area corresponding to the expected touch position.

10. The method of claim 9, wherein the program instructions that verify the expected touch position of the object comprise:
    program instructions that verify a pixel corresponding to a position of the object among a plurality of pixels forming the object image data; and
    program instructions that verify the expected touch position at which the object is to touch on the touch screen by mapping a pixel of the verified object image data to a pixel forming the touch screen.

11. The method of claim 10, wherein the program instructions that enlarge and output the area corresponding to the expected touch position comprise program instructions that enlarge and output a screen which is displayed on an area corresponding to the verified expected touch position with a specific ratio.

* * * * *